United States Patent Office 2,993,800
Patented July 25, 1961

2,993,800
WAX-IN-WATER EMULSIONS AND PROCESS FOR THEIR PREPARATION

Marion W. Pickell, Bartlesville, Okla., assignor to Kerr-McGee Oil Industries, Inc., a corporation of Delaware
No Drawing. Filed Sept. 6, 1957, Ser. No. 682,270
32 Claims. (Cl. 106—271)

This invention relates to novel wax emulsions and to an improved process for preparing such emulsions. More particularly the invention relates to wax-in-water type emulsions and their preparation, the preferred dispersed phase being either hydrocarbon wax or ester-type wax.

There are a number of references in the prior art relating to the preparation of wax-in-water emulsions. The wax emulsions prepared by conventional prior art methods are generally acceptable for use in compositions such as protective coatings, polishes, and creams, but have certain inherent deficiencies and undesirable characteristics which have restricted their use for some industrial uses or processes. For example, the wax-in-water emulsions produced by prior art processes are unable to effectively size paper or cellulosic fibers without the need for a sizing aid, such as papermaker's alum, and the attendant close control of pH during the sizing process. It will be apparent to those skilled in the art that it would be very advantageous, both from the practical and economic viewpoints, to provide a wax-in-water emulsion useful as a sizing for paper or cellulosic fibers which does not require a costly sizing aid or close control of pH during the sizing process. Much time and effort has been spent by others in attempting to solve this problem, but without success prior to the present invention.

I have discovered that if a wax is emulsified with water in the presence of an organic emulsifying agent of the type promoting an oil-in-water emulsion and at a phase volume ratio for the fluid wax-water system which yields an emulsion having substantially a maximum viscosity for the temperature of emulsification, the resultant emulsion has very unusual and unique properties. The emulsions prepared in accordance with the present invention exhibit phenomenal resistance to creaming, sedimentation, breaking during handling and may be readily diluted or letdown without adverse effect on the properties of the emulsions. Further, emulsions prepared by the process of the present invention are unique in their ability to size paper or cellulosic fibers under both acidic and alkaline conditions and without the need for a setting agent, such as papermaker's alum. The emulsions of the invention are further characterized by, among other things, a very fine average particle size and exceptional uniformity of particle size.

It is an object of the present invention to provide a new and improved wax-in-water emulsion.

It is a further object of the present invention to provide a new and improved wax-in-water emulsion of small average particle size and exceptional uniformity of particle size and which exhibits phenomenal stability characteristics.

It is still a further object of the present invention to provide a new and improved process for producing the foregoing wax-in-water emulsions.

It is still a further object of the present invention to provide a new and improved process for producing the foregoing wax-in-water emulsions, the process being characterized by emulsification of fluidized wax with water in the presence of an organic emulsifying agent which promotes an oil-in-water type emulsion, and while maintaining the phase volume ratio for the wax-water system within the range yielding an emulsion having substantially a maximum viscosity at the temperature of emulsification.

These and other objects of the present invention will become more apparent to those skilled in the art by reference to the following detailed description.

The waxes useful for the purpose of the present invention include waxes of the paraffin hydrocarbon type as well as waxes of the ester-type. The paraffin hydrocarbon waxes are usually derived from petroleum sources, while the ester-type waxes are usually derived from animal or plant sources, but in recent years synthetic ester-type waxes have been derived by esterification of suitable organic acids and alcohols. Examples of suitable vegetable waxes are carnauba, Japan, bayberry, and candelilla. Examples of the synthetic ester-type waxes are the esters of polyhydroxy alcohols with suitable monocarboxylic acids, such as the esters of glycerol or glycol with pine rosin, tall oil, oleic and stearic acids. These polyhydroxy alcohol and monocarboxylic acid esterification products are frequently referred to as estergum. Another class of synthetic esters suitable for the purpose of the present invention and sometimes associated with the synthetic ester-type waxes are the high molecular weight synthetic esters derived by the esterification of suitable polycarboxylic acids and polyhydroxy alcohols. The ester prepared from glycol and phthalic acid or from glycol and anhydrides of acids such as succinic and maleic are typical examples. Still another class of suitable synthetic esters are esters prepared from suitable polycarboxylic acids or their anhydrides and monohydroxy alcohols. Specific examples of esters of this type are dibutylphthalate and di-2-ethylhexylphthalate. The above synthetic esters may vary from heavy liquids at room temperature to a solid having a melting point of about 300° F. to 350° F. or higher.

The term "wax" or "hydrocarbon waxes and ester waxes" as used in the specification and claims is intended to include at least one suitable "wax" from the foregoing classes of "waxes," whether naturally occurring or synthetic.

The highly stable wax-in-water emulsions of the present invention have an average wax particle size of less than 1 micron in diameter, preferably ½ to 1 micron or smaller, with substantially no particles greater than 4 microns. It will be appreciated that there are certain preferred procedural steps embodied in the method to to be described hereinafter and that preferred emulsions are obtained when these preferred procedural steps are carried out. Otherwise, inferior emulsions are obtained.

It is an essential condition of the process of the present invention that the phase volume ratio for the wax-water system be maintained within the range yielding an emulsion having substantially a maximum viscosity at the temperature of the emulsification for the particular wax-in-water system. If this condition is not met, the average wax particle size will be greater than 1 micron in most instances.

The wax-in-water emulsions of the present invention are preferably prepared by a continuous method of controlled and simultaneous addition of fluidized wax and water phases. However, it is also possible to prepare the emulsions of the invention by a non-continuous process characterized by controlled separate and incremental additions of the fluid wax and water phases to a preformed emulsion of the invention. The wax is emulsified with water in the presence of an organic emulsifying agent of the type which promotes an oil-in-water emulsion while maintaining the phase volume ratio for the wax-water system within the range yielding an emulsion having substantially a maximum viscosity at the temperature of emulsification, regardless of whether the continuous or non-continuous process is used.

The continuous process mentioned above comprises incorporating an organic emulsifying agent in the water, preferably continuously but the organic emulsifier may be added batchwise to the water before its use. The water containing the organic emulsifier is then allowed to flow through a colloid mill at substantially less than half the mill's capacity. A fluid or fluidized wax is then fed to the colloid mill, the rate of feed of wax being increased as long as the viscosity of the emulsion thus produced is increasing. As the rate of feed of fluid wax is increased and at a certain wax to water ratio, the emulsion viscosity will be found to decrease and if the rate of wax feed is too great, the emulsion may ever be found to reverse. If the emulsion is reversed, the wax feed rate should be decreased, or alternatively the feed rate of water containing the emulsifier may be increased until the wax to water ratio is such as to give a wax-in-water emulsion having substantially a maximum viscosity at the temperature of emulsification. The point where the emulsion viscosity no longer increases is the incipient reversal point and the emulsion will have substantially its maximum viscosity at this point for the particular temperature of emulsification. Once the rates of feed of water and wax are adjusted to that proportion giving an emulsion having substantially a maximum viscosity for the temperature of the emulsification, the feed rates are then maintained substantially constant to produce the emulsion of the present invention. However, it is understood that slight adjustments in the feed rates may be necessary from time to time.

If the rate of preparation of the wax emulsion is too slow, the emulsion output may be increased by increasing the water feed rate and simultaneously increasing the fluid wax feed rate sufficiently to maintain the critical phase volume ratio, above discussed, which yields an emulsion of substantially a maximum viscosity for the temperature of emulsification.

The off-grade emulsion produced during start-up operations or at other times may be recycled to the colloid mill, thereby reducing loss of raw materials. The recycling of emulsion is not limited to reclaiming of off grade emulsion. For example, if it is desired to make emulsions using extremely low percentages of emulsifier, i.e. less than 2% in the final emulsion, recycle of the emulsion may be of advantage. However, the preferred embodiment of this invention uses sufficient emulsifier to produce a high grade emulsion without the necessity for recycling.

The emulsions of the present invention may also be produced by controlled separate and incremental addition of the two phases, i.e. fluid wax and water, if a colloid mill or similar equipment for continuous processing is not available. When using this embodiment of the present invention, a small amount of preformed emulsion is first prepared which has substantially a maximum viscosity at the temperature of emulsification. This preformed emulsion is preferably formed by adding with agitation a fluid or fluidized wax to a small amount of water containing up to 50% of suitable organic emulsifier. Usually the more emusifier used, the easier it is to obtain the desired preformed emulsion. The fluid wax is added very slowly to the water containing emulsifier, and the addition of fluid wax is continued as long as the viscosity of the emulsion increases. When a certain phase volume ratio of fluid wax to water is reached, the viscosity of the emulsion will decrease slightly and if addition of fluid wax is continued without further addition of water, the emulsion will invert to give a water-in-wax emulsion. Therefore at the point where the viscosity of the emulsion shows a decrease, alternate incremental additions of water and fluid wax should be resorted to. The ratio of addition of water to fluid wax should be such as to maintain the phase volume ratio in that proportion which existed just before the first decrease in viscosity occurred.

The water added by alternate incremental additions may or may not contain emulsifier. The necessity for emulsifier in the added water is determined by the amount of emulsifier present in the preformed emulsion, the percent emulsifier desired in the finished emulsion and the smallest amount of emulsifier necessary to effectively emulsify the particular wax. The smallest amount of emulsifier which will effectively emulsify the waxes of the present invention is approximately 0.5% by weight based on the total emulsion weight, but quantities of emulsifier as high as 8% or higher may be used in most instances. The minimum amount of emulsifier is to a certain extent a function of the particular emulsifier being used, and the particular wax being emusified.

Paraffin waxes having melting points of 120–145° F. and microcrystalline wax having a melting point of 155° F., when emulsified in accordance with the present invention, produce emulsions having an average particle size in the dispersed phase of less than ½ micron in diameter with none larger than ½ micron in diameter. Emulsions of these materials produced in accordance with the process of the invention exhibit exceptional stability against creaming, sedimentation and when used to size paper of the kraft type, they produce a TAPPI size value of 20 and higher on the alkaline side and without the use of alum.

An emulsion prepared by the non-continuous process of the invention from glycol abietate ester produced an emulsion having an average particle size in the dispersed phase of less than 1 micron in diameter, and with very few particles of a size larger than 1 micron in diameter. This estergum emulsion sizes kraft type paper effectively on both the alkaline and acid sides. The respective TAPPI size values obtained with this emulsion as a sizing agent was found to be 22 at a pH of 8+ (no alum used) and 18 at a pH of 4.5 (alum used to control pH). Other esters of the estergum type give comparable results as paper sizes when prepared according to either procedure of the present invention.

Emulsions of synthetic ester type waxes derived from polyhydroxy alcohols and polybasic acids or from monohydroxy alcohols and polybasic acids may be produced by either the continuous or non-continuous embodiment of the process of the invention. The resultant emulsions have an average particle size in the dispersed phase of 1 micron in diameter or less with very few particles larger than 1 micron in diameter and substantially no particles of a size larger than 4 microns in diameter. Emulsions of these esters made in accordance with the process of the invention will effectively size paper on either the acid or alkaline side, and without the use of a substantive such as alum, or the necessity for close control of pH.

The physical characteristics of the waxes useful in practicing the present invention may vary over a wide range. For example, the waxes may vary from heavy oils at room temperature to waxes having a melting or softening point as high as 350° F. or higher. The preferred waxes usually have melting or softening points varying from about 120° F. to 200° F.

When it is desired to use a wax having a melting or softening point of 140° F. or higher, it is preferred to cutback the wax with a suitable solvent for the purpose of obtaining a working fluidity at the desired temperature. Otherwise, it is necessary to resort to pressurized emulsification. Due to the sharp melting point of waxes, it is necessary in some cases that the colloid mill temperature be adjusted, preferably by means of a preheated jacket or heat exchange system, to permit the emulsion emerging from the mill to be above the melting temperature of the wax. The inclusion of solvent in the wax feed need not affect the ultimate use of the finished emulsion as the solvent may be of the volatile type and later volatilized during a drying operation instant to the use of the emulsion. When the term "wax" is used in the specification and claims, or when a specific wax is mentioned in the specification or claims, it is understood that if the melting or softening point of the wax is too high for a proper working fluidity, either the wax is cutback with a suitable solvent or pressurized emulsification is employed, or both.

Since many waxes useful for the purpose of the invention have melting or softening points greater than 140° F., it is desirable to emulsify the wax at the highest practical temperature in order to prevent the wax from setting too fast. Temperature limitations are somewhat governed by the selection of the solvent used in cutting back the wax. One reason for employing cutback wax is for ease of handling in the formation of the emulsion. When a wax is cutback with solvent, its viscosity is lowered, thereby facilitating its incorporation into water without the necessity of raising the temperature to the boiling point of the water.

The ability of a given solvent to lower the viscosity of a particular wax over a temperature range is influenced to some degree by the viscosity characteristics with change in temperature exhibited by the given solvent. For example, a highly paraffinic solvent may give a smaller change in viscosity with a change in temperature than an aromatic type solvent. Therefore, the viscosity effect on the cutback wax at a particular temperature is a function of the percent wax and cutback solvent present in the mixture and their respective natures.

Among the many satisfactory volatile-type solvents which may be used are kerosene, gasoline, high flash naphtha solvents, paraffinic raffinates etc. Mineral spirits, which is essentially a non-aromatic material, is a preferred volatile type solvent for most waxes since it possesses a high flash point and a relatively narrow boiling range. In some cases, use of waxes cutback with an aromatic type solvent to prepare the emulsion yields an emulsion which gives indifferent sizing values.

Among the many satisfactory non-volatile type solvents useful for the purpose of the invention are solvents such as either straight run or cracked heavy distillates. Specific examples of such non-volatile solvents include recycle oil, gas oil and light lubricating stocks. Emulsions containing the non-volatile solvents are preferred in some instances, for example in the sizing of paper, where it is usually desirable for the non-volatile solvent to be retained as an integral part of the wax solids deposited on the paper.

The balance between the hydrophilic and hydrophobic groups of the emulsifier may be varied by changing the nature of the basic constituent which reacts with the acidic portion. For example, if potassium is substituted for sodium in the sodium soap of stearic acid, the potassium stearate thus formed is more amenable to the process of the invention than is sodium stearate. This may be due to a better balance between the hydrophilic and hydrophobic groups of the emulsifying agent, which has the effect of permitting a greater variation in the wax-to-water phase volume ratio in the zone of emulsification near the incipient reversal point. With an emulsifying agent which may be referred to as having a proper balance between the hydrophilic and hydrophobic groups, it is relatively easy to adjust the wax-to-water phase volume ratio to maintain a substantially maximum viscosity near the incipient reversal point. If an emulsifying agent has a poor balance between the hydrophobic and hydrophilic groups, the phase volume ratio is so critical that the task of maintaining a substantially maximum viscosity near the incipient reversal point becomes extremely difficult and in some cases almost impossible.

The maximum viscosity obtainable in accordance with the process of the invention for a given wax-water system varies with the temperature of emulsification. For example, when the emulsification occurs at a relatively low temperature, e.g. 120° F., the maximum viscosity is much higher than if the emulsification occurs at a higher temperature, e.g., 190° F., at least during the emulsification process and when the temperature is maintained at the higher temperature. However if one or more emulsions prepared at various temperatures of emulsification are allowed to cool to a given temperature, the viscosity of each emulsion will be approximately the same for any given wax-water system. The various organic emulsifiers may also have a tendency to affect the viscosity of the continuous phase (water) of the emulsion.

The organic emulsifiers useful for the purpose of the present invention are those known in the art as promoters of oil-in-water emulsions, such as water soluble soaps of fatty acids, preferably having a carbon chain within 14 to 18 carbon atoms, or mixtures of such fatty acids. Examples of suitable acids forming water soluble soaps with alkali include oleic, palmitic, stearic, lauric, naphthenic, tall oil, rosin acids (primarily abietic acid or its derivatives), oxidized hydrocarbons containing carboxylic groups, and mixtures thereof. The water soluble alkali metal soaps of rosin and tall oil are preferred for economic reasons.

The water soluble organic salt-type emulsifiers useful in the practice of the invention may be prepared by reacting fatty acids with a basic substance including alkali and lower organic amines having less than 6 carbon atoms in the chain. Examples of alkali suitable for forming water soluble soaps are the alkali oxides, hydroxides, and carbonates, of which sodium hydroxide is usually preferred. This preference is primarily of an economic nature and in certain instances potassium hydroxide is preferred, as in the case of stearic acid soaps. When ammonium soaps are used, an excess of free ammonia or ammonium hydroxide is normally used because of the pronounced tendency of ammonia to be volatilized during the emulsification process. Examples of suitable organic amines include ethylene diamine, morpholene and ethylene amine.

Other suitable emulsifying agents for the purpose of the present invention are the alkali salts or soaps of organic sulfonic acids which are known to be promoters of oil-in-water emulsions, i.e., water continuous emulsions. Examples of such emulsifying agents are the alkali salts or soaps of alkyl sulfonic acid, aryl sulfonic acid and alky aryl sulfonic acid. The alkyl aryl sulfonates are available commercially as sodium octadecyl benzene sulfonate and Nacconol NR, a sodium alkylaryl sulfonate made from kerosene.

While formulations for the production of the wax-in-water emulsions of the present invention may vary somewhat depending upon the characteristics of the various individual ingredients, a preferred formulation for preferred waxes is as follows:

| | Percent |
|---|---|
| Wax | 40–60 |
| Solvent (cutback) | 0.20 |
| Emulsifying agent | 0.5–8 |
| Water (approx.) | 30–40 |

The above is not intended to preclude the use of higher percentages of emulsifying agent or of solvent. As much as 20% by weight and higher of emulsifier will usually form satisfactory emulsions and higher percentages by weight of solvent may also be desirable if the wax is of an extremely viscous nature. For example, when emulsifying waxes having a softening or melting point of about 200° F. or higher, it is generally preferred to use a formulation comprising as much as 20% solvents in order to obtain a fluid wax at the emulsification temperature. In such instances, it is understood that the percentage of water will depend upon the quantity of water necessary to form an emulsion having substantially a maximum viscosity for the particular wax-water system at the temperature of the emulsification.

Examples illustrating the preparation of specific emulsions in accordance with the process of the invention are as follows:

*Example I*

A chemicolloid pilot plant colloid mill driven by 1 H.P., 3600 r.p.m., 220 volt, 3 phase motor was used in the production of an emulsion by the preferred continuous once through emulsification process of the present invention.

To start the emulsification process, a water solution of sodium tallate was fed to the mill at the rate of about 20 pounds per hour. Then, fluid paraffin wax having a melting point of about 135° F. was fed to the mill. The rate of feed was slow initially and then gradually increased. It was not necessary to cut back the paraffin wax due to its relatively low melting point, but is was desirable for practical reasons to adjust the temperature of the colloid mill by means of a preheated jacket to a temperature above the melting point of the wax, thus permitting the emulsion emerging from the mill to remain above the melting temperature of the wax and to allow easier handling.

The soapy water and fluid wax was injected into a common line essentially as they entered the colloid mill. The emulsion coming from the mill at this time was of very low viscosity due to the low initial wax feed rate. The feed rate of fluid wax was gradually increased, thereby changing the phase volume ratio of wax to water. This had the effect of increasing the viscosity of the emulsion, and the feed rate of wax was gradually increased as long as the viscosity of the emulsion emerging from the mill increased. Eventually a point was reached where an increase in the feed rate of wax began to cause a decrease in the viscosity of the emulsion. This indicated an incipient reversal of phases or perhaps in some cases complete reversal of phases. At this point, the feed rate of wax was decreased until the phase volume ratios were approximately the same as the phase volume ratio where the initial drop in viscosity of the emulsion occurred. Minor adjustments of the feed rates of the wax and water were then made to give an emulsion of substantially a maximum viscosity at the temperature of the emulsification. It was also possible to start the foregoing continuous emulsification process by commencing the wax feed first and then gradually increasing the soapy water feed rate until a point was reached whereby the emulsion had a maximum viscosity.

Emulsions of substantially a maximum viscosity at the temperature of emulsification are produced by the above process. The particles of the emulsion have an average particle size of less than ½ micron in diameter with substantially no particles of a diameter larger than ½ micron. The preferred emulsions thus produced were found to contain about 1 part by weight soap to each 10 parts by weight of wax, in addition to sufficient water to produce an emulsion having substantially a maximum viscosity at the temperature of emulsification.

The above emulsion exhibited exceptional stability against creaming and sedimentation. When the emulsion was used to size paper of the kraft type, on the alkaline side and without the use of alum, a TAPPI size value of 20 or higher was obtained.

It was found that the foregoing process may be modified to recycle at least a portion of the emulsion. This modification is desirable in reclaiming the off-grade emulsion produced when commencing the emulsification process, and also allows more convenient operation when less than about 3% emulsifier is used.

The above procedure may be modified by operating the colloid mill under pressure where the melting or softening point of the wax is above about 140° F. and it is undesirable to incorporate a solvent in the emulsion formulation. A suitable pressure is usually about 100 pounds p.s.i. but higher pressures may be necessary if the melting or softening point of the wax is unusually high. This allows the wax to be heated to temperatures such that it possesses the proper fluidity characteristics and yet will not permit boiling of the water phase in the colloid mill. In such a pressurized system, it is necessary to allow the finished emulsion to cool under pressure to a temperature well below the boiling point of water, preferably to a temperature as low as 140° F. Where a pressurized system is used, the viscosity of the emulsion may be controlled by installing a viscosimeter of the Ultra-Viscon type in the flow line leading from the colloid mill to the pressurized reservoir.

*Example II*

Example I describes the preferred continuous emulsification process of the invention. However, it is also possible to form the emulsions of the present invention by a batch process such as described hereinbelow.

Thirty parts by weight of sodium tallate were placed in a vessel with approximately an equal quantity by weight of water. Then 200 parts by weight of glycol abietic ester (the proprietary product known as polypale ester No. 1) and 5 parts by weight mineral spirits were placed in a separate vessel and maintained at a temperature of about 300° F. The heated cutback ester was then added in small amounts to the water solution of sodium tallate and with vigorous agitation. A mixer capable of developing high torque at low speed and sweeping the entire mixing area of the vessel, which may be of the conventional bakery mixer type, should be used in agitating the mixture. The viscosity of the agitated mixture was found to gradually increase upon slow addition to the cutback ester or estergum. Upon continued addition of the ester the viscosity of the emulsion reached a maximum and then showed a tendency to decrease, thus indicating a tendency toward incipient reversal of the emulsion to form a water-in-wax emulsion. At this point the emulsion produced was substantially at a maximum viscosity for the (wax-water) system at the temperature of emulsification and it is this emulsion that is referred to in the specification and claims as being a "preformed emulsion." It was then necessary to begin the incremental addition of water, preferably at ambient temperature. The controlled addition of water prevents undesirable reversal of the emulsion and maintains the viscosity of the emulsion at substantially a maximum for the temperature of the emulsification. Maintaining the mixture at substantially the maximum viscosity at the temperature of the emulsification is essential to produce the fine particle size of the emulsion of the present invention.

Increments of water were added alternately with increments of the cutback ester while maintaining the critical phase volume ratio necessary to produce a maximum viscosity. Increments of ester and water may be added simultaneously, if desired, provided the ratio is such as to maintain a maximum viscosity. The incremental addition of water and ester was continued until all the wax was incorporated in the water and the emulsification process was completed.

The emulsion produced by the above non-continuous process of the invention was found to have an average particle size of 1 micron in diameter or less, very few particles larger than 1 micron in diameter, and substantially no particles of a size larger than 4 microns. The above emulsion containing 200 parts by weight of ester, 5 parts by weight of mineral spirits, 30 parts by weight of sodium tallate, 230 parts by weight of water, was found to size kraft type paper stock effectively on both the alkaline and acid sides. The respective TAPPI size values obtained using this emulsion as a sizing agent were 22 at a pH of 8+ (no alum used) and 18 at a pH of 4.5 (alum used to control the pH). Other waxes of this type have been found to give comparable results as paper sizing agents.

Example III

An emulsion was prepared from the glycol ester of phthalic acid by the preferred continuous once through emulsification process described in Example I. The emulsion formulation consisted of 1 part by weight soap to each 10 parts by weight of ester gum, together with sufficient water to produce an emulsion having a maximum viscosity at the temperature of the emulsification.

The above prepared emulsion was found to have an average particle size of 1 micron in diameter or less, with very few particles of a size larger than 1 micron in diameter, and substantially no particles of a size larger than 4 microns in diameter. This emulsion was found to give acceptable TAPPI size values when used to size paper of the kraft type on the alkaline side and without the use of a substantive such as alum. Close control of pH during the sizing process was not necessary.

Example IV

An emulsion was prepared using dibutyl phthalate as the dispersed phase by the preferred continuous once through emulsification process described in Example I. The formulation of this emulsion comprised 1 part by weight of soap to each 10 parts by weight of dibutyl phthalate, together with sufficient water to produce an emulsion having a maximum viscosity at the temperature of the emulsification.

The above emulsion was found to have an average particle size of less than 1 micron in diameter, very few particles of a size larger than 1 micron in diameter, and substantially no particles of a size larger than 4 microns in diameter. This emulsion was found to size paper of the kraft type on the alkaline side and to give satisfactory TAPPI size values without the use of a substantive such as alum. Close control of pH during the sizing process was not necessary.

Example V

A paraffin-in-water emulsion was prepared by the preferred continuous once-through emulsification process described in Example I. The procedure followed and the formulation of this emulsion was identical with that of Example I, with the exception of substituting Nacconol NR for the sodium tallate emulsification agent of Example I. Thus, the emulsion formulation comprised 1 part by weight of Nacconol NR for each 10 parts by weight of paraffin, together with sufficient water to produce an emulsion having a maximum viscosity at the temperature of the emulsification.

The above prepared emulsion was found to have an average particle size of less than ½ micron in diameter and substantially no particles of a diameter larger than ½ micron. The emulsion exhibited exceptional stability against creaming and sedimentation. When the emulsion was used to size paper of the kraft type, on the alkaline side and without the use of alum, a TAPPI size value of 20 or higher was obtained.

Once an emulsion of the present invention has been prepared, whether by the continuous process or the batch process of the invention, the unusual and unique properties of the emulsions are not adversely affected by the further addition of water. For example, the emulsion of the present invention, after the emulsification is completed, may be diluted or let down to meet the specifications of a customer's requirements for an emulsion of lower wax content. The emulsions of the present invention whether in a concentrated or letdown form, exhibit phenomenal resistance to creaming, sedimentation and resistance to breaking during handling, as in pumps, etc. Also, they may be stored for relatively long periods of time without adverse effect.

The foregoing specific description of the present invention is for the purpose of illustration only and is not limiting to the scope of the invention which is set forth in the claims.

I claim:

1. A highly stable wax-in-water emulsion having as an emulsifying agent a water soluble organic emulsifier which promotes the formation of oil-in-water type emulsions, an average particle size in the dispersed phase of less than 1 micron in diameter with substantially no particles in the dispersed phase of a diameter greater than 4 microns and the emulsion being prepared by a process comprising emulsifying at least one wax selected from the class consisting of hydrocarbon waxes and ester waxes and water in the presence of the emulsifying agent by dispersing the wax in the water in a ratio providing an emulsion having substantially the maximum viscosity for the wax-in-water system at the temperature of emulsification.

2. The highly stable wax-in-water emulsion of claim 1 wherein the wax is of petroleum origin.

3. The highly stable wax-in-water emulsion of claim 2 wherein the average particle size in the dispersed phase is less than ½ micron in diameter with substantially no particles in the dispersed phase of a diameter greater than ½ micron.

4. The highly stable wax-in-water emulsion of claim 1 wherein the wax is of the ester gum type.

5. The highly stable wax-in-water emulsion of claim 1 wherein the wax is an ester of a monohydroxy alcohol and a polycarboxylic acid.

6. The highly stable wax-in-water emulsion of claim 1 wherein the wax is an ester of a polyhydroxy alcohol and a polycarboxylic acid.

7. The highly stable wax-in-water emulsion of claim 1 wherein the wax is a naturally occurring wax derived from a vegetable source.

8. The highly stable wax-in-water emulsion of claim 1 wherein the emulsifier is a water soluble soap of a higher fatty acid.

9. The highly stable wax-in-water emulsion of claim 1 wherein the emulsifier is the alkali salt of an organic sulfonic acid selected from the class consisting of aryl sulfonic acids, alkyl sulfonic acids, and alkyl aryl sulfonic acids.

10. In a process for preparing a wax-in-water emulsion having as an emulsifying agent a water soluble organic emulsifier which promotes the formation of water continuous emulsions, the improvement which comprises emulsifying at least one wax selected from the class consisting of hydrocarbon waxes and ester waxes and water in the presence of the emulsifying agent by dispersing throughout the emulsification the wax in the water in a ratio of wax to water providing an emulsion having substantially the maximum viscosity for the wax-in-water system at the temperature of emulsification, the wax being in the liquid phase at the time of emulsification, the resultant wax-in-water emulsion having an average particle size in the dispersed phase of less than one micron in diameter with substantially no particles in the dispersed phase of a diameter greater than four microns.

11. In a process for preparing a wax-in-water emulsion having as an emulsifying agent a water-soluble organic emulsifier which promotes the formation of water continuous emulsions, the improvement which comprises producing a preformed emulsion which constitutes a minor portion of the total emulsion by emulsifying a minor portion of the constituents of the emulsion, the preformed emulsion being prepared by emulsifying at least one wax selected from the class consisting of hydrocarbon waxes and ester waxes and water in the presence of the emulsifying agent by dispersing throughout the emulsification the wax in the water in a ratio of wax to water providing an emulsion having substantially the maximum viscosity for the wax-in-water system at the temperature of emulsification, and then preparing an additional portion of the emulsion while continuously maintaining the phase volume ratio of the wax and water within the range yielding substantially a maximum viscosity for the wax-in-water system at the temperature of emulsification, the additional portion of the smulsion being prepared by dispersing throughout the emulsification the wax in the water in a ratio of wax to water providing an emulsion having substantially the maximum viscosity for the wax-in-water system at the temperature of emulsification, the wax being in the liquid phase at the time of emulsification, the resultant wax-in-water emulsion having an average particle size in the dispersed phase of less than one micron in diameter with substantially no particles in the dispersed phase of a diameter greater than four microns.

12. The process for sizing a cellulosic product of a fibrous nature which comprises the steps of depositing on the fibers of the cellulose active sizing constituents of a wax-in-water emulsion by intimately contacting the cellulosic fibers with the emulsion; the active sizing constituents of the emulsion being deposited on the cellulosic fibers in the absence of a precipitating agent; the dispersed phase of the emulsion consisting essentially of at least one wax selected from the class consisting of hydrocarbon waxes and ester waxes; the emulsion being characterized by having as an emulsifying agent an organic emulsifier which promotes the formation of water continuous emulsions, an average particle size in the dispersed phase of less than one micron in diameter with substantially no particles in the dispersed phase of a diameter greater than four microns, an ability to size the cellulosic fibers on the acid side and the alkaline side, and the emulsion being produced by emulsifying the wax and water in the presence of the emulsifying agent by dispersing throughout the emulsification the wax in the water in a ratio of wax to water providing an emulsion having substantially the maximum viscosity for the wax-in-water system at the temperature of emulsification, the wax being in the liquid phase at the time of emulsification; and subsequently forming the resultant sized fibers into manufactured form.

13. The process of claim 12 wherein the cellulosic fibers are contacted with the emulsion and sized on the acid side.

14. The process of claim 12 wherein the cellulosic fibers are contacted with the emulsion and sized on the alkaline side.

15. The process for sizing a cellulosic product of a fibrous nature which comprises the steps of intimately contacting cellulosic fibers of kraft pulp with a wax-in-water emulsion to deposit active sizing constituents of the emulsion on the fibers; the active sizing constituents of the emulsion being deposited on the cellulosic fibers in the absence of a precipitating agent; the cellulosic fibers being contacted with the emulsion at a pH higher than 7.0; the dispersed phase of the emulsion consisting essentially of at least one wax selected from the class consisting of hydrocarbon waxes and ester waxes; the emulsion being characterized by having as an emulsifying agent an organic emulsifier which promotes the formation of water continuous emulsions, an average particle size in the dispersed phase of less than one micron in diameter with substantially no particles in the dispersed phase of a diameter greater than four microns, an ability to size the cellulosic fibers on the acid side and the alkaline side, and the emulsion being produced by emulsifying the wax and water in the presence of the emulsifying agent by dispersing throughout the emulsification the wax in the water in a ratio of wax to water providing an emulsion having substantially the maximum viscosity for the wax-in-water system at the temperature of emulsification, the wax being in the liquid phase at the time of emulsification; and subsequently forming the resultant sized fibers into manufactured form.

16. The process for forming a highly stable wax-in-water emulsion of claim 11 wherein the wax is of petroleum origin.

17. The process for forming a highly stable wax-in-water emulsion of claim 11 wherein the average particle size in the dispersed phase is less than ½ micron in diameter with substantially no particles in the dispersed phase of a diameter greater than ½ micron.

18. The process for forming a highly stable wax-in-water emulsion of claim 11 wherein the wax is of the ester gum type.

19. The process for forming a highly stable wax-in-water emulsion of claim 11 wherein the wax is an ester of a monohydroxy alcohol and polycarboxylic acid.

20. The process for forming a highly stable wax-in-water emulsion of claim 11 wherein the wax is an ester of a polyhydroxy alcohol and a polycarboxylic acid.

21. The process for forming a highly stable wax-in-water emulsion of claim 11 wherein the wax is a naturally occurring wax derived from a vegetable source.

22. The process for forming a highly stable wax-in-water emulsion of claim 11 wherein the emulsifier is a water soluble soap of a higher fatty acid.

23. The process for forming a highly stable wax-in-water emulsion of claim 11 wherein the emulsifier is the alkali salt of an organic sulfonic acid selected from the class consisting of aryl sulfonic acids, alkyl sulfonic acids, and alkyl aryl sulfonic acids.

24. In a process for forming a highly stable wax-in-water emulsion having as an emulsifying agent a water soluble organic emulsifier which promotes the formation of water continuous emulsions, the emulsion having an average particle size in the dispersed phase of less than 1 micron in diameter with substantially no particles in the dispersed phase of a diameter greater than 4 microns and being prepared from at least one wax selected from the class consisting of hydrocarbon waxes and ester waxes, which comprises producing a preformed emulsion which constitutes a small fractional portion of the total emulsion by emulsifying minor proportions of the constituents of the emulsion, the preformed emulsion being prepared by emulsifying the wax and water in the presence of the emulsifying agent by dispersing the wax in the water in a ratio providing an emulsion having substantially the maximum viscosity for the wax-in-water system at the temperature of emulsification, creating a stream of at least a portion of the preformed emulsion, continuously introducing wax and water into the stream of preformed emulsion at a rate to continuously maintain the phase volume ratio of the wax-water system within the range yielding substantially a maximum viscosity for the system at its temperature, effecting turbulence in the stream, applying emulsifying agent to the stream of preformed emulsion prior to effecting turbulence, the wax being in the liquid phase at the time of emulsification, continuously withdrawing a portion of the stream subsequent to turbulence, and circulating the remainder as fresh preformed emulsion stream.

25. The process for forming a highly stable wax-in-water emulsion of claim 24 wherein the wax is of petroleum origin.

26. The process for forming a highly stable wax-in-water emulsion of claim 25 wherein the average particle size in the dispersed phase is less than ½ micron in diameter with substantially no particles in the dispersed phase of a diameter greater than ½ micron.

27. The process for forming a highly stable wax-in-water emulsion of claim 24 wherein the wax is of the ester gum type.

28. The process for forming a highly stable wax-in-water emulsion of claim 24 wherein the wax is an ester of a monohydroxy alcohol and a polycarboxylic acid.

29. The process for forming a highly stable wax-in-water emulsion of claim 24 wherein the wax is an ester of a polyhydroxy alcohol and a polycarboxylic acid.

30. The process for forming a highly stable wax-in-water emulsion of claim 24 wherein the wax is a naturally occurring wax derived from a vegetable source.

31. The process for forming a highly stable wax-in-water emulsion of claim 24 wehrein the emulsifier is a water soluble soap of a higher fatty acid.

32. The process for forming a highly stable wax-in-water emulsion of claim 24 wherein the emulsifier is the alkali salt of an organic sulfonic acid selected from the class consisting of aryl sulfonic acids, alkyl sulfonic acids, and alkyl aryl sulfonic acids.

References Cited in the file of this patent

UNITED STATES PATENTS

| | | |
|---|---|---|
| 1,986,936 | Lewers | Jan. 8, 1935 |
| 2,144,642 | Stoughton et al. | Jan. 24, 1939 |
| 2,238,109 | Griesinger | Apr. 15, 1941 |
| 2,288,351 | Griffith | June 30, 1942 |
| 2,395,025 | Wassell | Feb. 19, 1946 |
| 2,441,842 | Prince | May 18, 1948 |
| 2,684,948 | Cross | July 27, 1954 |

UNITED STATES PATENT OFFICE
CERTIFICATE OF CORRECTION

Patent No. 2,993,800                                            July 25, 1961

Marion W. Pickell

It is hereby certified that error appears in the above numbered patent requiring correction and that the said Letters Patent should read as corrected below.

Column 3, line 25, for "ever" read -- even --; column 5, line 36, for "effect" read -- affect --; column 6, line 55, for "octadecyl" read -- octydecyl --; column 9, line 70, for "let down" read -- letdown --; column 10, line 5, for "limting" read -- limiting --; column 11, line 8, for "smulsion" read -- emulsion --.

Signed and sealed this 9th day of January 1962.

(SEAL)
Attest:

ERNEST W. SWIDER                                 DAVID L. LADD
Attesting Officer                                    Commissioner of Patents